US011463335B2

(12) United States Patent
Zeng et al.

(10) Patent No.: US 11,463,335 B2
(45) Date of Patent: *Oct. 4, 2022

(54) SYSTEMS AND METHODS FOR NETWORK ANALYSIS AND MANAGEMENT

(71) Applicant: AT&T Intellectual Property I, L.P., Atlanta, GA (US)

(72) Inventors: Helen Zeng, San Ramon, CA (US); Guanying Ru, San Ramon, CA (US); Srikanth Hariharan, Sunnyvale, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 369 days.

This patent is subject to a terminal disclaimer.

(21) Appl. No.: 16/741,453

(22) Filed: Jan. 13, 2020

(65) Prior Publication Data
US 2020/0153718 A1 May 14, 2020

Related U.S. Application Data

(63) Continuation of application No. 15/982,204, filed on May 17, 2018, now Pat. No. 10,547,526.

(51) Int. Cl.
*H04L 43/06* (2022.01)
*H04L 43/00* (2022.01)
(Continued)

(52) U.S. Cl.
CPC ............ *H04L 43/065* (2013.01); *H04L 43/04* (2013.01); *H04L 43/0876* (2013.01);
(Continued)

(58) Field of Classification Search
CPC ... H04L 43/065; H04L 43/04; H04L 43/0876; H04L 43/14; H04W 24/08; H04W 36/0061; H04W 52/146
See application file for complete search history.

(56) References Cited

U.S. PATENT DOCUMENTS

| 5,832,368 A | 11/1998 | Nakano |
| 6,006,096 A | 12/1999 | Trompower |

(Continued)

FOREIGN PATENT DOCUMENTS

| JP | 2007088811 A | 4/2007 |
| JP | 4686532 B2 | 5/2011 |
| WO | WO2013181843 A1 | 12/2013 |

OTHER PUBLICATIONS

Bhaumik et al., CloudIQ: A framework for processing base stations in a data center, Proceedings of the 18th annual international conference on Mobile computing and networking, ACM, 2012.
(Continued)

*Primary Examiner* — Ronald B Abelson
(74) *Attorney, Agent, or Firm* — Amin, Turocy & Watson, LLP

(57) ABSTRACT

A network analysis and management system includes a processor coupled to a communications interface and a non-transitory memory. The processor is configured to read instructions from the non-transitory memory to cause the system to perform operations comprising receiving log data associated with communication between a first user device and a network using a first protocol stack including a plurality of layers. A plurality of network events are generated based on the log data. Each network event is associated with a respective log data entry of the log data and a respective layer of the plurality of layers. First network analysis information is generated by correlating first and second network events using a correlation configuration associated with a network management task. A network management message is generated using the first network analysis information, and transmitted to one of the first user device and the network for performing the network management task.

20 Claims, 14 Drawing Sheets

(51) Int. Cl.
    *H04L 43/04*     (2022.01)
    *H04L 43/0876*     (2022.01)
    *H04W 24/08*     (2009.01)
    *H04W 52/14*     (2009.01)
    *H04W 36/00*     (2009.01)
    *H04L 43/065*     (2022.01)

(52) U.S. Cl.
    CPC ............ *H04L 43/14* (2013.01); *H04W 24/08* (2013.01); *H04W 36/0061* (2013.01); *H04W 52/146* (2013.01)

(56) References Cited

U.S. PATENT DOCUMENTS

| | | |
|---|---|---|
| 8,073,011 B2 | 12/2011 | Watanabe |
| 8,107,963 B2 | 1/2012 | Tsai |
| 8,155,145 B2 | 4/2012 | Kocaturk |
| 8,441,939 B2 | 5/2013 | Chang |
| 8,881,259 B2 | 11/2014 | Ferdinand |
| 9,042,839 B2 | 5/2015 | Takahashi |
| 9,098,605 B2 | 8/2015 | Kitagawa |
| 9,106,875 B2 | 8/2015 | Chang |
| 9,204,293 B2 | 12/2015 | Imbimbo |
| 9,246,789 B2 | 1/2016 | Tanaka |
| 9,656,749 B1 | 5/2017 | Hanlon |
| 10,271,258 B2 | 4/2019 | Van Der Velde |
| 2005/0060403 A1 | 3/2005 | Bernstein |
| 2010/0041365 A1 | 2/2010 | Lott |
| 2014/0082439 A1 | 3/2014 | Kitagawa |
| 2018/0069610 A1 | 3/2018 | Alexander |

OTHER PUBLICATIONS

Tappayuthpijarn, Adaptive video streaming over a mobile network with TCP-friendly rate control, Proceedings of the 2009 International Conference on Wireless Communications and Mobile Computing: Connecting the World Wirelessly. ACM, 2009.

Radhakrishnan, Cross layer design for efficient video streaming over LTE using scalable video coding, Communications (ICC), 2012 IEEE International Conference on. IEEE, 2012.

Non-Final Office Action received for U.S. Appl. No. 15/982,204 dated Jun. 3, 2019, 18 pages.

Correlation Key Configurations 500

| Link Direction | Event Category/Layer | | Correlation Key Rule |
|---|---|---|---|
| Uplink | MAC | | Frame_Number*10 + Subframe_Number ← 502 |
| | RLC | Data | (Frame Number*10 + Subframe Number) - (Re-tx_Index − 1) * 8 ← 504 |
| | | VoLTE | (Frame Number*10 + Subframe number) - (Re-tx_Index − 1) /Bundled_Subframe_Number * 8 ← 506 |
| | PHICH | | (Frame_Number*10 + Subframe_Number + 4) mod Rotation_Subframe_Number ← 508 |
| Downlink | MAC | | Concatenation of Frame_Number and Subframe_Number ← 510 |
| | RLC | | |
| | Serving/Neighbor Cell Information | | Serving Physical Cell ID ← 512 |

Network Management Device 102

FIG. 5

VoLTE UL MAC Layer Events 700

| | Timestamp 402 | Event Category 404 | Frame Number 408 | Subframe Number 410 | Event Properties 412 | |
|---|---|---|---|---|---|---|
| | | | | | Re-tx Index | Tx Power |
| 702-1 | 23:48:51.034 | MAC | 858 | 3 | 1 | 19 |
| 702-2 | 23:48:51.163 | MAC | 870 | 2 | 1 | 18 |
| 702-3 | 00:12:22.645 | MAC | 707 | 5 | 5 | 20 |

VoLTE UL RLC Layer Events 704

| | Timestamp 402 | Event Category 404 | Frame Number 408 | Subframe Number 410 | Event Properties 412 | |
|---|---|---|---|---|---|---|
| | | | | | rb_cfg_idx | RLC Bytes |
| 706-1 | 23:48:51.160 | RLC | 870 | 2 | 5 | 21 |
| 706-2 | 00:12:22.630 | RLC | 706 | 3 | 5 | 81 |
| 706-3 | 00:12:22.630 | RLC | 706 | 7 | 5 | 84 |

Network Analysis Information 708

| | Timestamp 402 | Frame Number 408 | Subframe Number | Event Properties | | | |
|---|---|---|---|---|---|---|---|
| | | | | Re-tx Index | Tx Power | rb_cfg_idx | RLC Bytes |
| 710-1 | 23:48:51.163 | 870 | 2 | 1 | 18 | 5 | 21 |
| 710-2 | 00:12:22.645 | 707 | 5 | 5 | 20 | 5 | 84 |

700 — 704

Network Management Device 102

FIG. 7

Serving Cell Info Events 900

| | Timestamp 402 | Event Category 404 | Physical Cell ID | Frame Number 408 | Subframe Number 410 | Event Properties 412 | | |
|---|---|---|---|---|---|---|---|---|
| | | | | | | PRB | TBS | Modulation | MCS |
| 904-1 | 16:46:40.990 | SERVING CELL INFO | 127 | 402 | 4 | 2 | 9 | QPSK | 2 |
| 904-2 | 16:46:41.030 | SERVING CELL INFO | 127 | 405 | 6 | 1 | 51 | 16QAM | 20 |
| 904-3 | 16:46:41.030 | SERVING CELL INFO | 127 | 406 | 4 | 2 | 105 | 16QAM | 20 |
| 904-4 | 16:46:41.330 | SERVING CELL INFO | 127 | 436 | 6 | 2 | 105 | 16QAM | 20 |

Neighbor Cell(s) Info Events 902

| | Timestamp 402 | Event Category 404 | Serving Physical ID | Number of Neighbor Cells | Event Properties 412 | | |
|---|---|---|---|---|---|---|---|
| | | | | | Physical Cell ID | Filtered RSRP (dB) | Filtered RSRQ (dB) |
| 906-1 | 16:46:41.164 | NEIGHBOR CELL(S) INFO | 127 | 1 | 347 | -91 | -29.88 |
| 906-2 | 16:46:41.324 | NEIGHBOR CELL(S) INFO | 127 | 2 | 347 | -91.31 | -29.44 |
| | | | | | 126 | -88.13 | -27.06 |
| 906-3 | 16:46:41.484 | NEIGHBOR CELL(S) INFO | 127 | 1 | 126 | -87.31 | -25.75 |

Network Management Device 102

FIG. 9A

Network Analysis Information 910

| | Timestamp | Event Category | Physical Cell ID | Frame Number 408 | Subframe Number 410 | Event Properties | | | | | |
|---|---|---|---|---|---|---|---|---|---|---|---|
| | | | | | | PRB | TBS | Modulation | MCS | Number of Neighbor Cells | Physical Cell ID | Filtered RSRP (dB) | Filtered RSRQ (dB) |
| 908-1 | 16:46:40.990 | SERVING CELL INFO | 127 | 402 | 4 | 2 | 9 | QPSK | 2 | 1 | 347 | -91 | -29.88 |
| 908-2 | 16:46:41.030 | SERVING CELL INFO | 127 | 405 | 6 | 1 | 51 | 16QAM | 20 | 1 | 347 | -91 | -29.88 |
| 908-3 | 16:46:41.030 | SERVING CELL INFO | 127 | 406 | 4 | 2 | 105 | 16QAM | 20 | 1 | 347 | -91 | -29.88 |
| 908-4 | 16:46:41.330 | SERVING CELL | 127 | 436 | 6 | 2 | 105 | 16QAM | 20 | 2 | 347 | -91.31 | -29.44 |
| | | | | | | | | | | | 126 | -88.13 | -27.06 |

904 — 906

Network Management Device 102

FIG. 9B

SYSTEMS AND METHODS FOR NETWORK ANALYSIS AND MANAGEMENT

PRIORITY DATA

The present application is a continuation application of U.S. patent application Ser. No. 15/982,204 (now U.S. Pat. No. 10,547,526), filed May 17, 2018, each of which is hereby incorporated by reference in its entirety.

FIELD OF THE DISCLOSURE

This disclosure relates generally to communication systems, and, more particularly, to systems and methods for network analysis and management.

BACKGROUND

Communication systems, for example, wireless communication systems, are widely deployed to provide various services such as telephony, video, data, messaging, and broadcast. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of such a telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology.

As the demand for mobile broadband access continues to increase, there exists a need for further improvements in the communication technology.

SUMMARY

Network analysis and management systems and methods are described. In various embodiments of the systems and methods disclosed herein, a network analysis and management system includes at least one communications interface, at least one non-transitory memory, and one or more processors coupled to the communications interface and non-transitory memory and configured to read instructions from the non-transitory memory to cause the system to perform operations. The operations include receiving log data associated with communication between a first user device and a network using a first protocol stack including a plurality of layers, generating, from the log data, a plurality of network events including first and second network events, each network event associated with a respective log data entry of the log data and a respective layer of the plurality of layers, and generating first network analysis information by correlating the first and second network events based on a correlation configuration associated with a network management task associated with the network. The operations further include generating a network management message based on the first network analysis information; and transmitting the network management message to one of the first user device and the network for performing the network management task.

In some embodiments, the network management task is associated with uplink power control of the first user device. The network management message includes one or more uplink power control parameters associated with the first user device.

In some embodiments, the first network event includes serving cell information associated with a serving cell of the network for the communication. The second network event includes neighboring cell information associated with one or more neighboring cells of the serving cell.

In some embodiments, the first user device is an unmanned aerial vehicle apparatus. The first and second network events are associated with a first height of the first user device. The operations further include generating second network analysis information using third and fourth network events based on the correlation configuration, and generating the network management message based on the first network analysis information and the second network analysis information.

In some embodiments, the first network event is associated with a first layer of the plurality of layers. The second network event is associated with a second layer of the plurality of layers.

In some embodiments, the first network event is associated with a downlink of the communication. The second network event is associated with an uplink of the communication.

In some embodiments, the correlating the first and second network events based on the correlation configuration includes: generating first and second correlation keys associated with the first and second network events respectively based on a correlation key configuration of the correlation configuration; and correlating the first and second network events by matching the first and second correlation keys.

BRIEF DESCRIPTION OF THE DRAWINGS

FIG. 5 is a diagram illustrating an embodiment of a network management device displaying a correlation key configurations screen or a portion thereof.

FIG. 7 is a diagram illustrating an embodiment of a network management device displaying a network analysis information screen or a portion thereof.

FIG. 9A is a diagram illustrating an embodiment of a network management device displaying a portion of a network analysis information screen; FIG. 9B is a diagram illustrating an embodiment of a network management device displaying another portion of the network analysis information screen.

Figure 1:
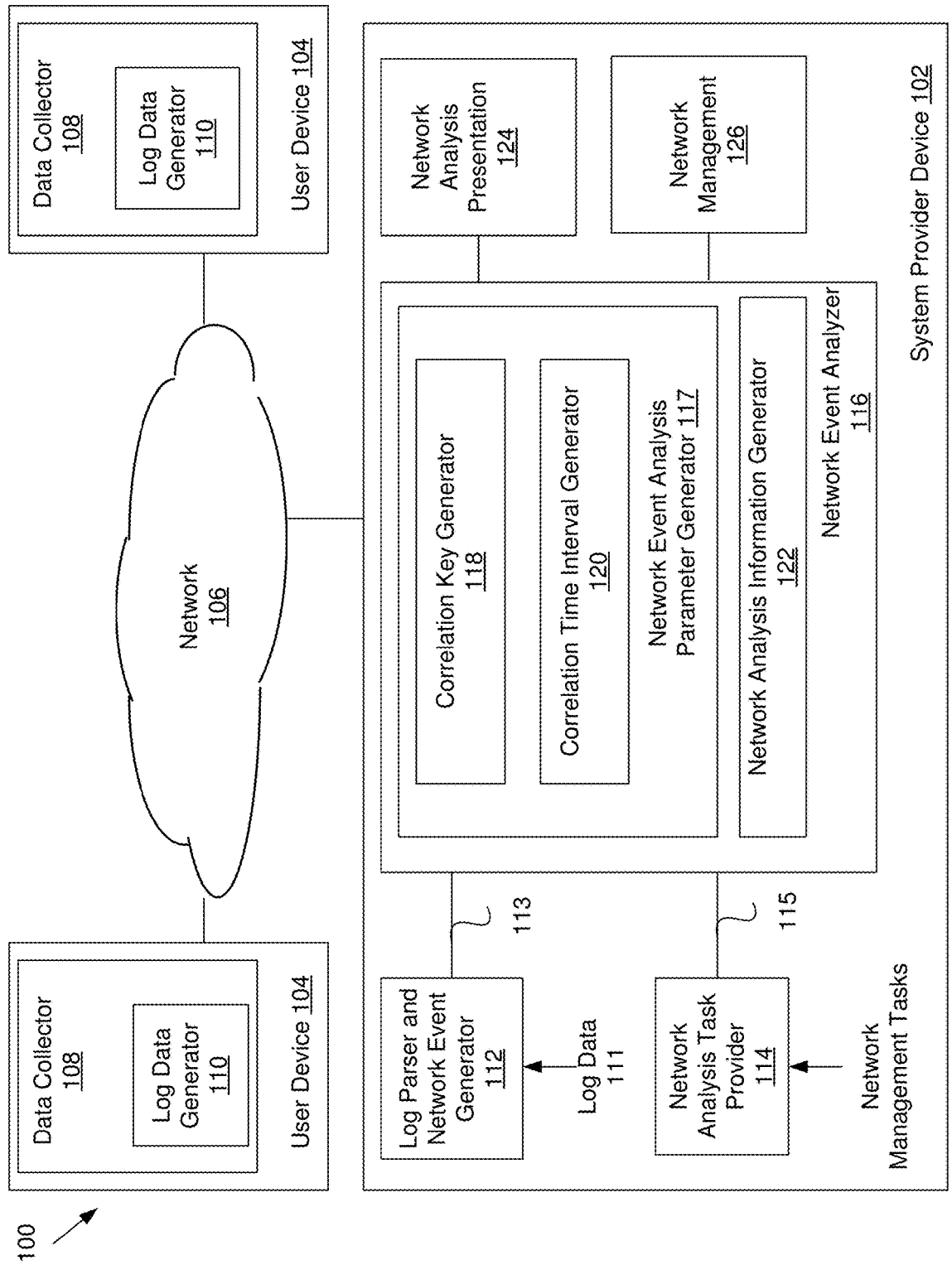
FIG. 1 is a schematic view illustrating an embodiment of a network analysis and management system.

Embodiments of the present disclosure may be understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Embodiments of the present disclosure include network analysis and management systems and methods that may be used, for example, to perform network analysis and management in real time or using historical log data from network devices of a network. As discussed above, as the demand for mobile broadband access continues to increase, there exists a need for further improvements in the communication technology. During network field and lab testing, user devices may generate a large amount of log data for the communication with the network. Typically, each log data entry in the log data is generated for a single layer of a protocol stack of the network. As such, those log data entries are isolated. While those log data entries may be used to evaluate key performance indicator (KPI) versus time, they usually do not provide a comprehensive and flexible way to evaluate the network using information from different layers together at a particular moment, including, for example, evaluate multiple KPIs based on the correlation therein.

The systems and methods of the present disclosure provide for a network analysis and management system that includes a log parser and network event generator that may generate network events corresponding to log data entries of the log data based on, for example, log data parsing rules and/or the communication standard. In addition, a network analysis task provider may provide network analysis tasks based on the network management tasks. A network event analyzer may analyze the network events based on the network analysis tasks by correlating corresponding network events based on a correlation configuration. A network management message may be generated based on the network analysis information and transmitted to the user device and the network for performing the network management task. Such network analysis and management systems and methods enable comprehensive and flexible log data analysis for various network management tasks including for example, evaluation, comparison, selection, and/or optimization (e.g., eNB scheduling optimization) of networks from different vendors, network evaluation and optimization for video transmission, and drone control (e.g., using power control) for reducing interference to neighbor cells, any other suitable application, and/or a combination thereof.

The network analysis and management systems and methods may be used for various types of networks (e.g., long term evolution (LTE) network or other third generation (3G), fourth generation (4G) wireless network, or fifth-generation (5G) wireless network, a satellite communication network, a microwave radio network, etc.), and machine learning may be applied by the network event analyzer to further improve network performance and quality.

Referring now to FIG. 1, an embodiment of a network analysis and management system 100 is illustrated. The network analysis and management system 100 includes a system provider device 102 and user devices 104 in communication over a communication network 106. The communication network 106 may be implemented by an example mobile cellular network, such as a long term evolution (LTE) network or other third generation (3G), fourth generation (4G) wireless network, or fifth-generation (5G) wireless network. However, in some examples, the communication network 106 may be additionally or alternatively implemented by one or more other communication networks, such as but not limited to, a satellite communication network, a microwave radio network, and/or other communication networks. In other examples, the system provider device 102 and/or user devices 104 may maintain a network connection through a wired (e.g., Ethernet) connection. In some embodiments, the communication network 106 may be provided by one or more vendors.

The system provider device 102 and user devices 104 may each include one or more processors, memories, and other appropriate components for executing instructions such as program code and/or data stored on one or more computer readable mediums to implement the various applications, data, and steps described herein. For example, such instructions may be stored in one or more computer-readable mediums such as memories or data storage devices internal and/or external to various components of the system 100, and/or accessible over the network 106.

Each user device 104 may be implemented using any appropriate combination of hardware and/or software configured for wired and/or wireless communication over network 106. For example, in one embodiment, the user device 104 may be implemented as a personal computer of a user in communication with the Internet. In some embodiments, the user device 104 may be a wearable device. In some embodiments, the user device 104 may be a smart phone, personal digital assistant (PDA), laptop computer, a drone (e.g., an unmanned aerial vehicle (UAV)), and/or other types of computing devices.

The user device 104 may include a data collector 108 for collecting various data associated with the user device 104, the network 106, and/or the communication between the user device 104 and the network 106. Examples of the collected data include location data indicating the location of the user device 104, and communication data associated various communication events for the communication between the user device 104 and network 106. In some embodiments, the data collector 108 includes a log data generator 110 that generates log data (e.g., log data 111) for the collected data. Such log data may be stored in a memory (e.g., located in the user device 104 or in another device other than the user device).

The system provider device 102 provides network analysis and management based on the information received from the user devices 104 over the communication network 106. In various embodiments, the network analysis and management may be performed based on a radio protocol architecture (e.g., an LTE protocol stack, a 5G protocol stack) associated with the communication network 106.

The system provider device 102 includes a log parser and network event generator 112, a network analysis task provider 114, a network event analyzer 116, a network analysis presentation unit 124, and a network management unit 126. The log parser and network event generator 112 may receive log data 111 through the network 106 (e.g., from one or more user devices 104), and generate network events 113 based on the parsed log data. The log parser and network event generator 112 may send the generated network events 113 to the network event analyzer 116.

In some embodiments, the network analysis task provider 114 of the system provider device 102 may determine one or more network analysis tasks 115 for a particular network management task for performing the network analysis and management. Such network management tasks may include for example, evaluation, comparison, selection, and/or optimization (e.g., eNB scheduling optimization) of networks from different vendors, network evaluation and optimization for video transmission, and drone control (e.g., using power control) for reducing interference to neighbor cells, any other suitable application, and/or a combination thereof. One or more network analysis tasks may be associated with each network management task.

Different network analysis tasks may be determined, by the network analysis task provider 114 for a particular network management task. The network analysis task may include a plurality (e.g., two, three, or more) network event categories. The network analysis task may also include a correlation configuration for correlating the network events of different categories to generate network analysis information. Such a correlation configuration may include correlation parameter configurations (e.g., correlation key configuration, correlation time interval configuration) for generating various correlation parameters for performing the network analysis task. After determining the network analysis task(s) for the particular network management task (e.g., using a network analysis task database coupled to the system provider device 102), the network analysis task provider 114 may send the determined network analysis task(s) 115 to the network event analyzer 116.

In some embodiments, the network event analyzer 116 receives the network events 113 from the log parser and network event generator 112, and receives the network analysis tasks 115 from the network analysis task provider 114. The network event analyzer 116 may then perform the network analysis tasks 115 using the network events 113, and generates network analysis information.

In the example of FIG. 1, the network event analyzer 116 includes a network event analysis parameter generator 117, which may generate network event analysis parameters for the network events, for example, based on a correlation configuration of a network analysis task. The network event analysis parameters may include, for example, correlation keys and correlation time intervals, any other suitable correlation parameters, and/or a combination thereof for correlating network events of different categories. In the example of FIG. 1, the network event analysis parameter generator 117 includes a correlation key generator 118, which may generate a correlation key for each relevant network event for the network analysis task, e.g., based on a correlation key configuration of the correlation configuration. The network event analysis parameter generator 117 also includes a correlation time interval generator 120, which may generate a correlation time interval for correlating network events of different categories, e.g., based on a correlation time interval configuration of the correlation configuration.

The network event analyzer 116 may perform network analysis using the network events, e.g., based on the network event analysis parameters from the network event analysis parameter generator 117, and generates network analysis information associated with the network analysis tasks. By correlating network events of different categories, the network analysis information may include correlated information associated with different layers of the protocol stack of the communication network, different communication directions (e.g., uplink and downlink), and/or different key performance indicators (KPIs). Such network analysis information enables comprehensive, flexible, and efficient network management solutions for various network management tasks.

In some embodiments, the network event analyzer 116 may send the network analysis information to the network analysis presentation unit 124, which may generate network analysis presentation data, transmit the network analysis presentation data to an operator device and cause the network analysis presentation data to be displayed to an operator (e.g., using a display of the operator device) with various visual representations. Such visual representations include, for example, number representations, graphical representations such as heat map using colors, shades, patterns, two-dimensional or three-dimensional representations, any suitable visual representation, and/or a combination thereof.

In some embodiments, the network event analyzer 116 may send the network analysis information to the network management unit 126, which may generate network management message (including e.g., control parameters and values, optimization recommendations) for the user device 104, the network 106, or any other any other user devices and networks that share similar network characteristics with the user device 104 or the network 106. In some embodiments, the network management message is sent to the user device 104 and/or network 106, and the corresponding network management tasks of the network management message are automatically performed by user device 104 and/or network 106. In alternative embodiments, the network management message is sent to an operator device, such that the operator may make decisions (e.g., select from recommendations, authorize, deny, start, and/or stop network management tasks) based on the network management message.

Figure 2:
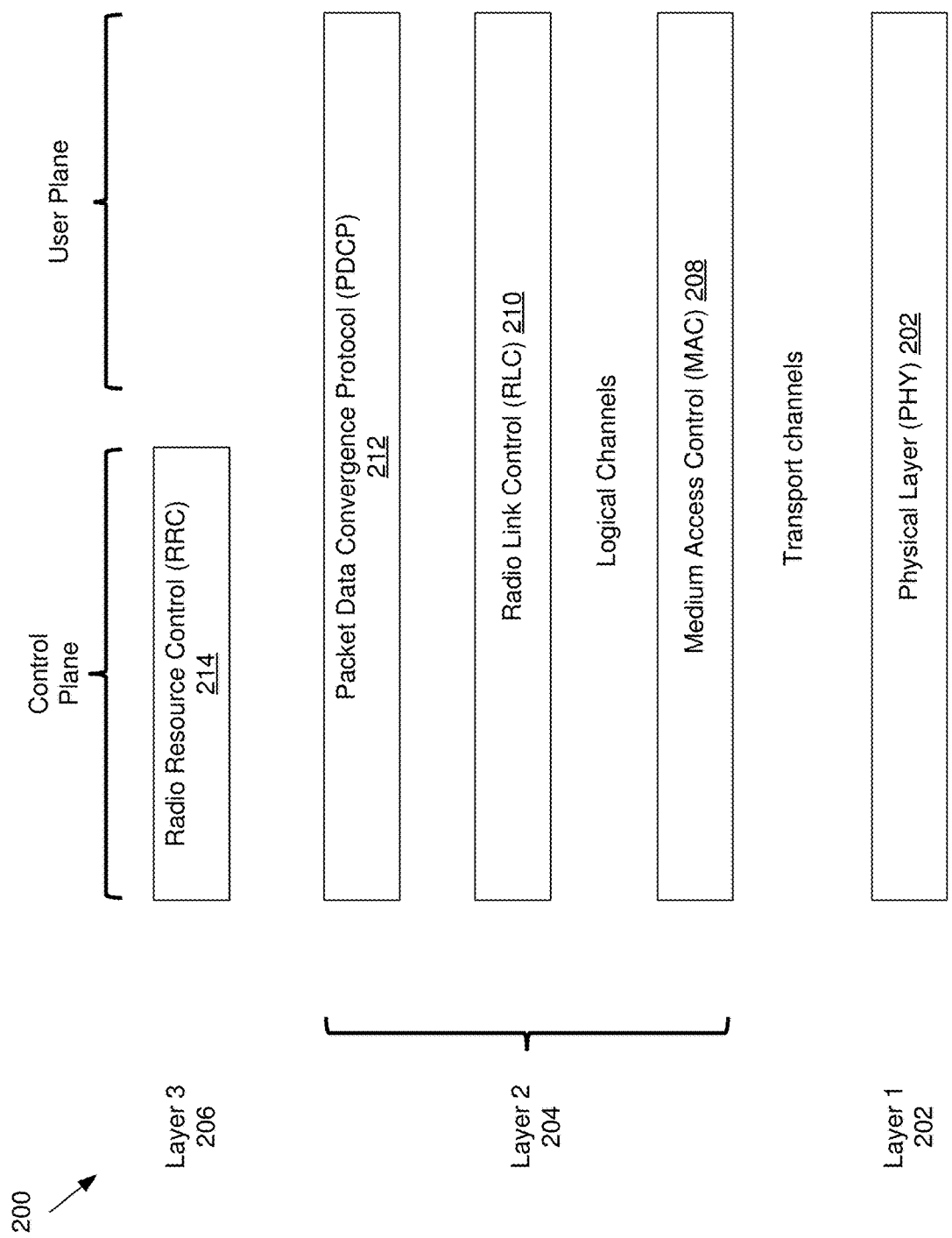
FIG. 2 is a schematic view illustrating an embodiment of a network protocol stack used in the network analysis and management system of FIG. 1.

Referring to FIG. 2, an exemplary protocol stack 200 of the LTE standard for a communication network 106 is illustrated. It is noted that the protocol stack 200 of FIG. 2 is exemplary only and not intended to be limiting beyond what is specifically recited in the claims that follow, and the network analysis and management system may be used for any suitable communication network.

As shown in FIG. 2, the protocol stack 200 includes a plurality of layers including layer 202 (Layer 1), layer 204 (Layer 2), and layer 206 (Layer 3). Layer 202 is the lowest layer and implements various physical layer signal processing functions, and is also referred to as a physical layer (PHY) 202. Layer 204 is above layer 202, and is responsible for the link between a user equipment (UE) (e.g., a user device 104) and evolved node B (eNB) (e.g., an eNB of an LTE communication network) over the physical layer 202.

In the user plane, the layer 204 includes a media access control (MAC) layer 208, a radio link control (RLC) layer 210, and a packet data convergence protocol (PDCP) layer 212. In some embodiments, the UE may have upper layers above the layer 204. Those upper layers may include a network layer (e.g., an IP layer) and an application layer.

In some embodiments, the PDCP layer 212 may provide multiplexing between different radio bearers and logical channels, header compression for upper layer data packets to reduce radio transmission overhead, security by ciphering the data packets, and handover failure, cell reselection failure, cell redirection failure, or out-of-service experience support for UEs between eNBs.

In some embodiments, the RLC layer 210 provides segmentation and reassembly of upper layer data packets, retransmission of lost data packets, and reordering of data packets to compensate for out-of-order reception due to hybrid automatic repeat request (HARQ).

In some embodiments, the MAC layer 208 may provide multiplexing between logical and transport channels, allocate various radio resources (e.g., resource blocks) in one cell among multiple UEs, and perform HARQ operations.

In the control plane, the protocol 200 is substantially the same as that of the user plane except the differences described below. In the control plane, the PDCP layer 212 may not perform the header compression function. The control plane includes a radio resource control (RRC) layer 214 in Layer 3 206. The RRC layer 214 may obtain radio resources (i.e., radio bearers) and for configuring the lower layers using RRC signaling between the eNB and the UE.

Figure 3:
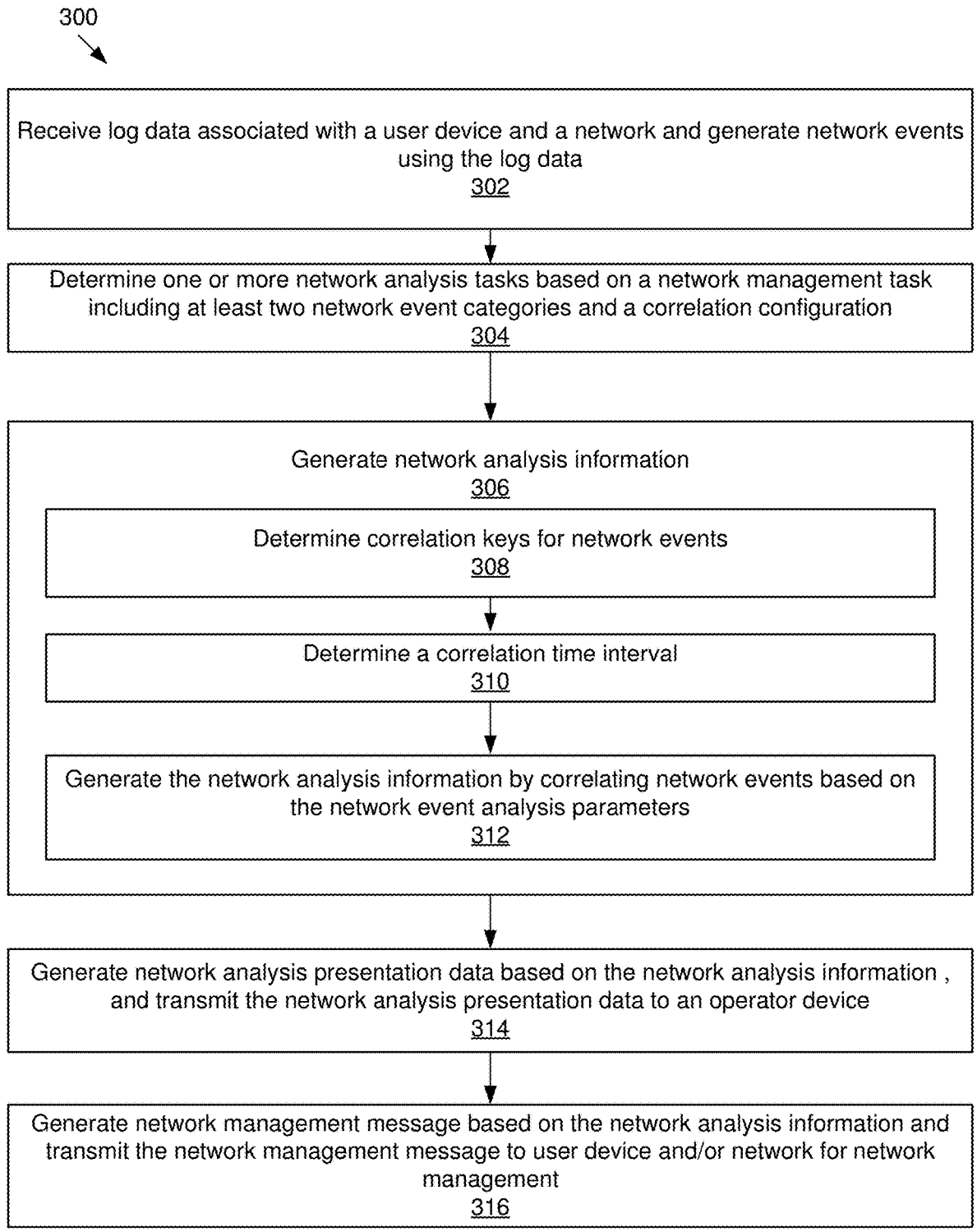
FIG. 3 is a flow chart illustrating an embodiment of a method for network analysis and management using the network analysis and management system of FIG. 1.

Referring to FIG. 3, a method 300 for network analysis and management is illustrated. The method 300 begins at block 302, where a network analysis and management system receives log data associated with network communication between a user device and a network. In the example of FIG. 1, at block 302, the system provider device 102 of the network analysis and management system 100 receives log data generated by a log data generator 110 from a user device 104. While in the example of FIG. 1 the log data generator 110 is located in the user device 104, in various embodiments, the log data generator 110 may be located in a separate device from the user device 104, and the system provider device 102 may receive the log data from that separate device. In some embodiments, the system provider device 102 may receive log data from other network elements (e.g., eNB) of the network 106. The log data may be generated using tools including, for example, the QUALCOMM eXtensible Diagnostic Monitor (QXDM) tool.

At block 302, the system provider device 102 may generate network event messages from the log data. In the example of FIG. 1, a log parser and network event generator 112 of the system provider device 102 may generate network events using the log data. In an example, the log parser and network event generator 112 may convert the log data from its raw file format (e.g., the QXDM format) to a text file, and parse the converted text file to generate network events based on log data parsing rules and/or communication standards.

Figure 4A:
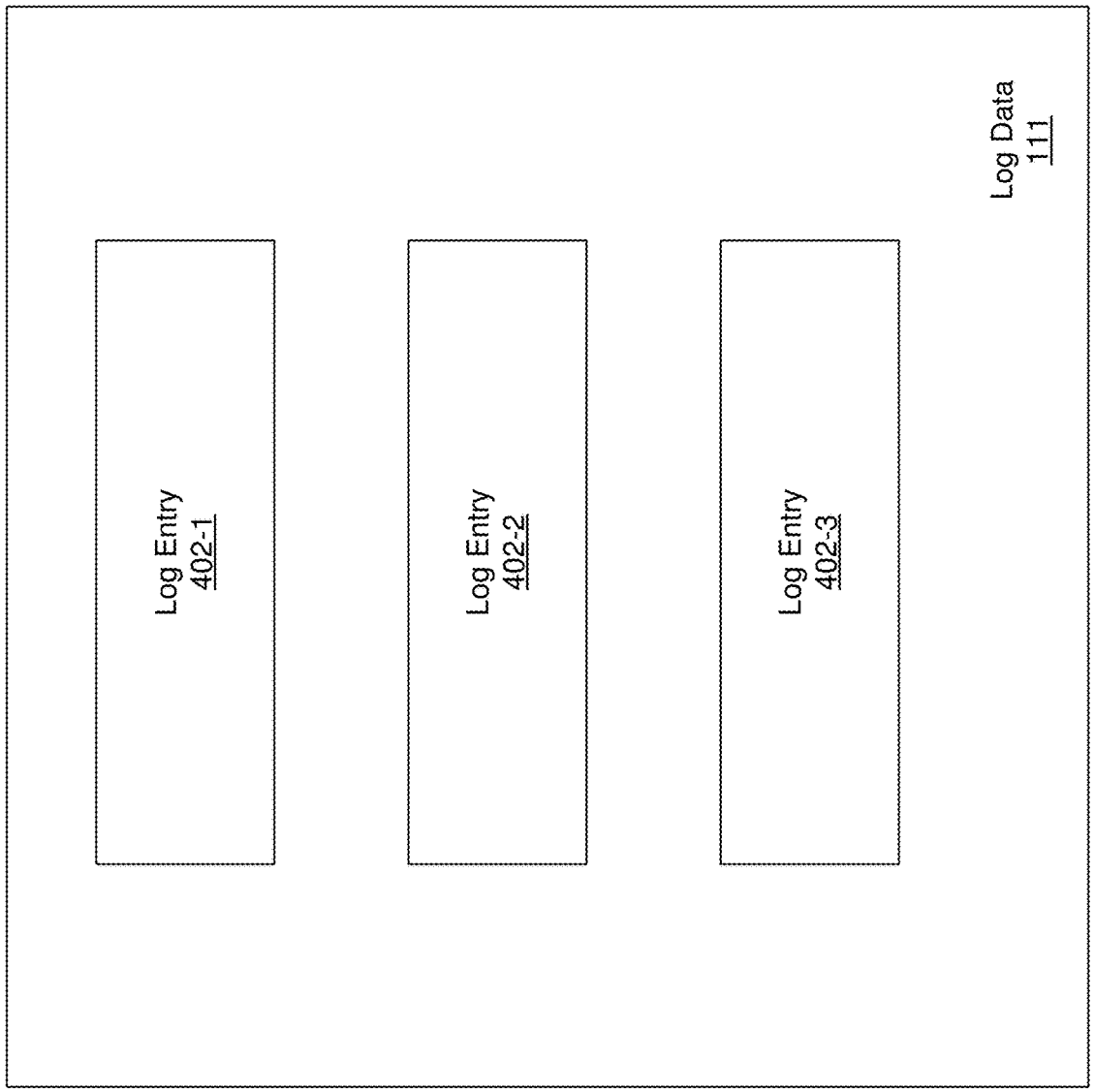
FIG. 4A is a diagram illustrating an embodiment of log data used in the network analysis and management system of FIG. 1.
Figure 4B:
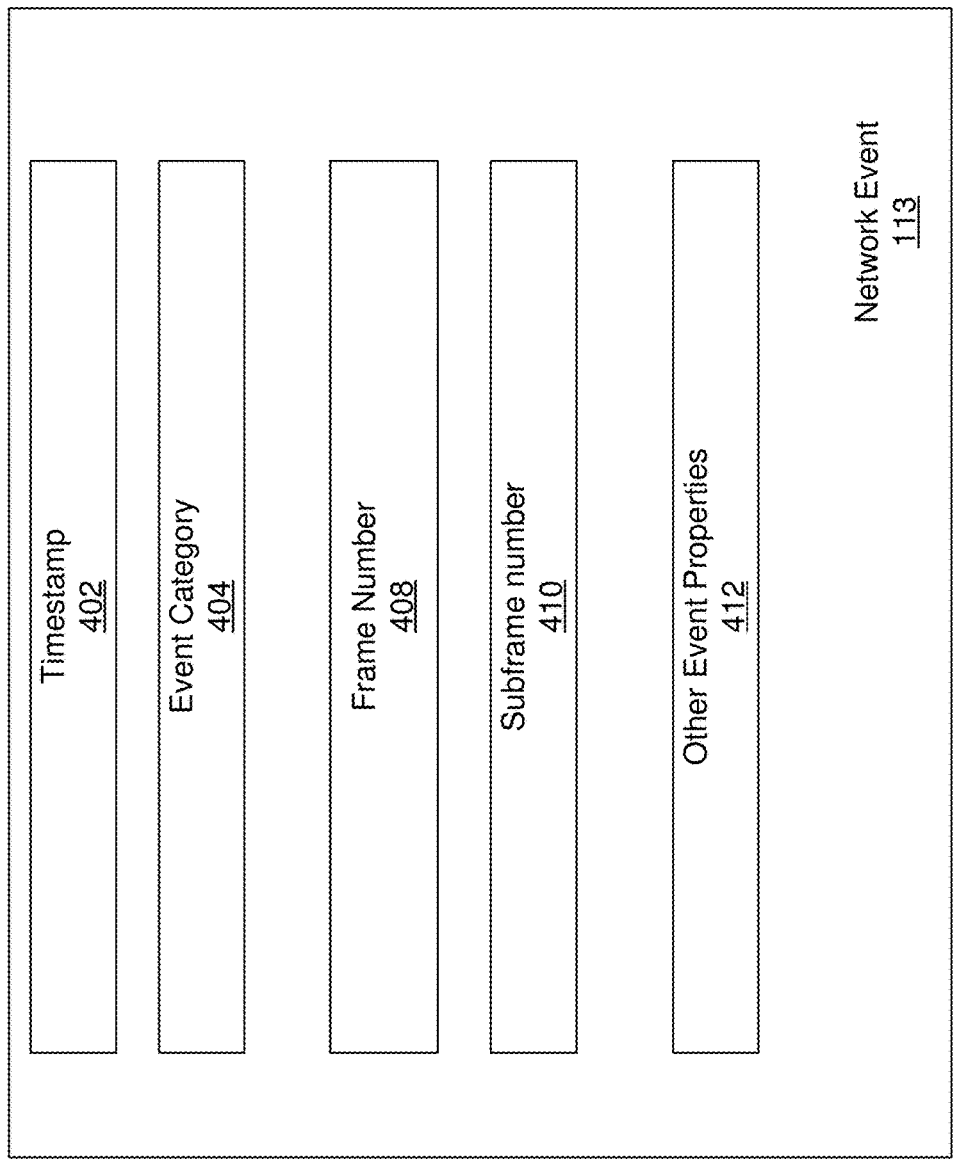
FIG. 4B is a diagram illustrating an embodiment of a network management device displaying a network event message screen or a portion thereof.

Referring FIGS. 4A and 4B, illustrated are examples of the log data 111 and the network events 113 generated based on the log data. As shown in FIG. 4A, log data 111 may include a plurality of log data entries 402-1, 402-2, and 403. Each log data entry may include a block of text corresponding to a network event of a particular layer, and a plurality of network event properties (including e.g., property identifier/name and property value). As shown in FIG. 4B, an exemplary network event 113 corresponding to a log data entry (e.g., log data entry 402-1) is illustrated. The network event 113 may include various network event properties extracted from the log data entry. Such network event properties may include a timestamp 402 indicating the time of the network event and an event category 404. The network event 113 may also include a frame number 408 and a subframe number 410 of the network 106. In some examples, in the time domain, different time intervals within LTE are expressed as multiples of a basic time unit (e.g., Ts=1/30720000), and a radio frame has a length of 10 ms (e.g., Tframe=307200*Ts). Each frame is divided into ten equally sized subframes of 1 ms in length (Tsubframe=30720·Ts). Scheduling is done on a subframe basis for both the downlink and uplink. As such, the time of the network event may also be represented using the frame number 408 and subframe number 410 for that network event. The network event 113 may include various other event properties 412, which may be different based on its event category 404. In some embodiments, each network event is associated with a single layer (e.g., one of a PHY layer 202, MAC layer 208, RLC layer 210, PDCP layer 212, RRC layer 214 of FIG. 2) of the network protocol stack.

In some embodiments, some event properties of the network event 113 may include extracted event properties directly provided by the log data. Alternatively, some event properties are calculated event properties determined based on the extracted event properties. For example, a particular network event associated with a VoLTE UL MAC layer may include extracted event properties including, for example, Physical Resource Block (PRB), Transport Block Size (TBS), and Modulation. For further example, that particular network event may include calculated event properties (e.g., UL modulation and coding scheme (MCS)) determined based on the extracted event properties (e.g., TBS, PRB, modulation) and/or other calculated event properties. Such calculation may be performed based on the standard (e.g., 3GPP LTE standard).

The method 300 may proceed to block 304, where the network analysis and management system determines network analysis tasks based on network management tasks, where each network analysis task may be associated with two or more network event categories. In some embodiments, the network management application is for UL power control for a user device (e.g., a drone). In those embodiments, a system provider device 102 may determine that the associated network analysis task is associated with multiple network event categories including, for example, serving cell information and neighbor cell information. In some embodiments, the network management tasks include eNB scheduling optimization, radio network optimization for video performance improvement, and vendor comparison. Each of those different network management tasks may be associated with different network analysis tasks using multiple network event categories.

The method 300 may then proceed to block 306, where one or more network analysis tasks are performed to generate network analysis information. Such a network analysis task may be performed using network events of different event categories. For example, network analysis information may be generated by correlating network events of different event categories based on a correlation configuration of a particular network management task. In various embodiments, the correlation configuration for various correlation parameters (e.g., correlating event categories, correlation key, correlation time interval, etc.) may be adjusted based on the network management task.

In some embodiments, at block 308, correlation keys may be determined for the network events of the network event categories associated with the network analysis task. In various embodiments, a correlation key generator (e.g., correlation key generator 118 of FIG. 1) may determine the correlation key using one or more network event properties. In some embodiments, different correlation key configurations for generating the correlation key may be applied to network events of different event categories based on different network properties, including for example, the communication link direction (e.g., uplink or downlink), event category and/or layer (e.g., MAC layer, RLC layer, Physical Hybrid ARQ Indicator Channel (PHICH)), cellular service type (e.g., data or VoLTE), any other suitable network event property, and/or a combination thereof.

Referring to the example of FIG. 5, illustrated is a system provider device 102 displaying a correlation key configurations screen 500. The correlation key configurations screen 500 includes correlation key configurations 502, 504, 506, and 508 for generating correlation keys for network events associated with an uplink. According to correlation key configuration 502, for a network event associated with a downlink and a MAC layer, the correlation key may be generated based on the corresponding correlation key rule (e.g., "Frame_Number*10+Subframe_Number"). In an example where the network event has a frame number of 870 and a subframe number of 2, the correlation key for that network event is computed to be 8702. In another example where the network event has a frame number of 707 and a subframe number of 5, the correlation key for that network event is computed to be 7075.

As shown in correlation key configurations 504 and 506, for a network event associated with a downlink and an RLC layer, the correlation key rule may be determined based on the cellular service type (e.g., data or VoLTE) associated with the network event. According to correlation key configuration 504, for a network event associated with a cellular service type of data, the correlation key may be generated based on the corresponding correlation key rule, e.g., (Frame_Number*10+Subframe_Number)−(Re-tx_Index−1)*8, where Re-tx_Index is the retransmit index associated with that network event. In an example where a network event is associated with a downlink, an RLC layer, and a cellular service type of data, and has a frame number of 406, sub frame number of 8, and a Re-tx_Index of 1, the corresponding correlation key is computed to be 4068. In another example where a network event is associated with a downlink, an RLC layer, and a cellular service type of data, and has a frame number of 406, subframe number of 8, and a Re-tx_Index of 6, the corresponding correlation key is computed to be 4028.

According to correlation key configuration 504, for a network event associated with a cellular service type of VoLTE, the correlation key may be generated based on the corresponding correlation key rule, e.g., (Frame_Number*10+Subframe_Number)−(Re-tx_Index−1)/Bundled_Subframe_Number*8, where Re-tx_Index is the retransmit index associated with that network event. The value of Bundled_Subframe_Number may be determined based on the TTI bundling mode of the VoLTE. When the TTI bundling is off, Bundled_Subframe_Number equals 1. When the TTI bundling is on, Bundled_Subframe_Number is the number (e.g., 4) of sub frames that are bundled together. In an example, a network event is associated with a downlink, an RLC layer, a cellular service type of VoLTE, a TTI bundling mode of off, and has a frame number of 870, sub frame number of 2, and a Re-tx_Index of 1. In that example, Bundled_Subframe_Number has a value of 1, and the corresponding correlation key is 8702. In another example, a network event is associated with a downlink, an RLC layer, a cellular service type of VoLTE, a TTI bundling mode of on, and has a frame number of 870, sub frame number of 2, and a Re-tx_Index of 5. In that example, Bundled_Subframe_Number has a value of 4, and the corresponding correlation key is 8694. In yet another example, a network event is associated with a downlink, an RLC layer, a cellular service type of VoLTE, a TTI bundling mode of on, and has a frame number of 870, sub frame number of 2, and a Re-tx_Index of 9. In that example, Bundled_Subframe_Number has a value of 4, and the corresponding correlation key is 8686.

According to correlation key configuration 508, for a network event associated with network event category of PHICH, the correlation key may be generated based on a rotation subframe number (e.g., 10240) associated with a rotation period of PHICH. Specifically, the correlation key may be computed using the corresponding correlation key rule, e.g., (Frame_Number*10+Subframe_Number+4) mod Rotation_Subframe_Number.

In the example of FIG. 5, correlation key configuration 510 is for generating a correlation key for a network event associated with a downlink. According to correlation key configuration 510, for a network event associated with a downlink and either a MAC layer or an RLC layer, the frame number (e.g., 870) and subframe number (e.g., 2) may be concatenated as strings to generate the correlation key (e.g., "8702").

As shown in correlation key configuration 512, in some embodiments, the correlation key for a network event may be determined based on event properties other than the frame number and subframe number. For example, correlation key configuration 512 provides that for a network event that has event categories of serving cell information and neighbor cell information, the correlation key may be generated using the serving cell The method 300 may then proceed to block 310, where a correlation time interval for correlating network events associated with the network analysis task is determined. In various embodiments, a correlation time interval generator (e.g., correlation time interval generator 120 of FIG. 1) may determine the correlation time interval based on the network analysis task and its associated network events, including, for example, network event properties thereof. Such network event properties may include, for example, the communication link direction (e.g., uplink or downlink), event categories (e.g., serving cell information and neighbor cell(s) information), and/or layers (e.g., MAC layer, RLC layer), any other suitable network event property, and/or a combination thereof.

Figure 6:
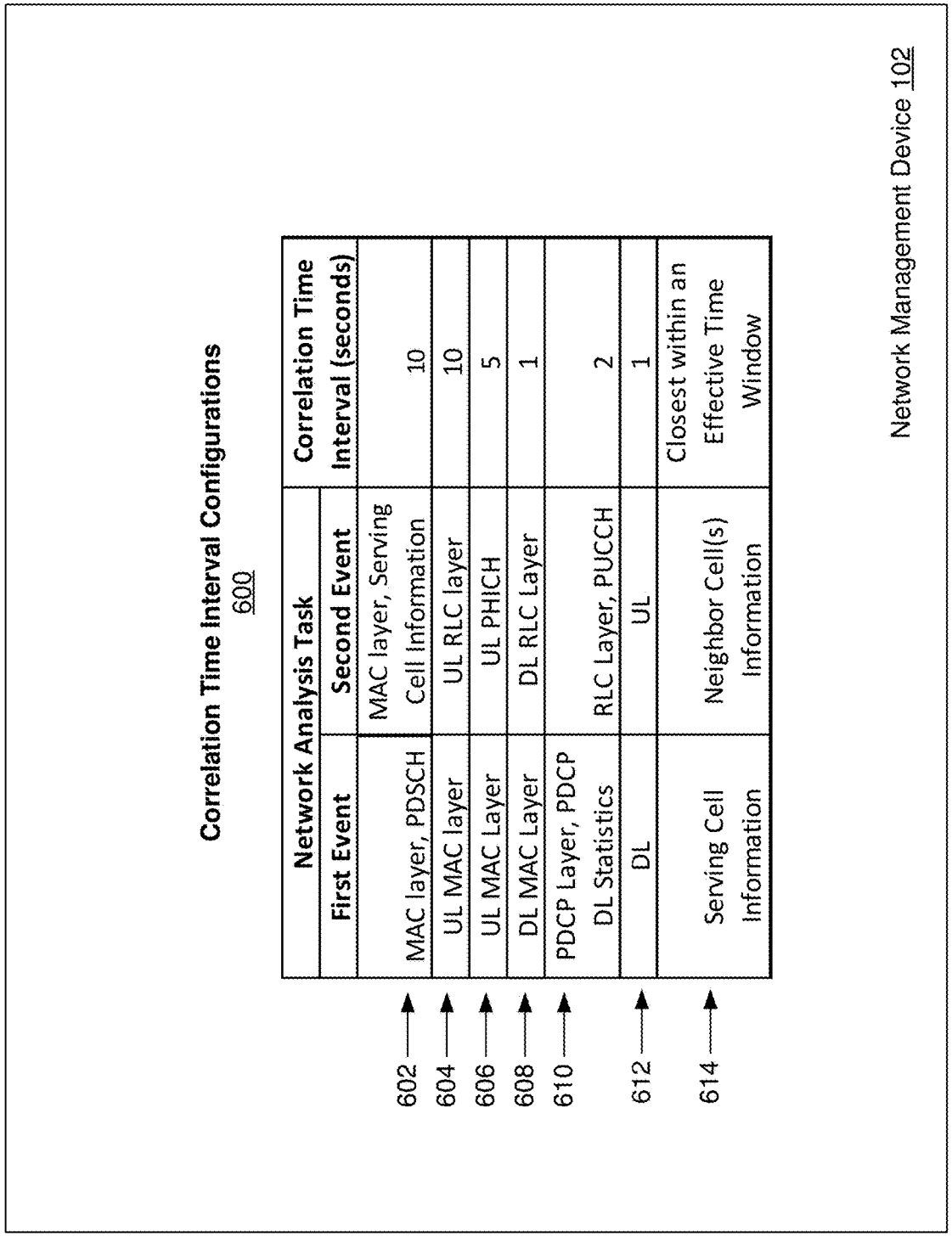
FIG. 6 is a diagram illustrating an embodiment of a network management device displaying a correlation time interval configurations screen or a portion thereof.

Referring to the example of FIG. 6, illustrated is a system provider device 102 displaying a correlation time interval configurations screen 600, which includes correlation time interval configurations 602, 604, 606, 608, 610, and 612 for determining correlation time intervals for various network analysis tasks. In various embodiments, correlation time interval configurations may indicate that correlation events are chosen based on fixed values (e.g., 10 seconds), closest in time within an effective time window (e.g., 10 seconds), or a variable value that may be determined based on properties of the user device (e.g., speed, location, session duration, etc.) and/or the network (e.g., communication channel conditions). In an example, a first correlation time interval for a first network event at a first time while the corresponding user device is moving at a first speed may be less than a second correlation time interval for a second network event of the same type at a second time while the corresponding user device is moving at a second speed less than the first speed. In another example, a first correlation time interval for a first network event of a first user device session for a user device may be less than a second correlation time interval for a second network event of a second user device session for that user device, where the second user device session has a duration greater than that of the first user device session.

As shown in correlation time interval configuration 602, in some embodiments, a network analysis task is performed using two network events of different categories that are associated with the same layer (e.g., MAC layer). In an example, a particular network analysis task is performed using a first network event of a network event category of physical downlink shared channel (PDSCH) statistics and a second network event of a network event category of serving cell information. In that example, according to correlation time interval configuration 602, the correlation time interval for the network analysis task is 10 seconds.

As shown in correlation time interval configuration 604, in some embodiments, a network analysis task is performed using two uplink network events of different categories. Those two network events may be associated with different layers, for example, MAC layer and RLC layer respectively. In the example of correlation time interval configuration 604, the correlation time interval for the corresponding network analysis task is 10 seconds.

As shown in correlation time interval configuration 606, in some embodiments, a network analysis task is performed using two uplink network events of different categories, where the first network event is associated with a MAC layer, and the second network event is associated with a network event category of PHICH statistics. In the example of correlation time interval configuration 604, the correlation time interval for the corresponding network analysis task is 5 seconds.

As shown in correlation time interval configuration 608, in some embodiments, a network analysis task is performed using two downlink network events of different categories. Those two network events may be associated with different layers, for example, MAC layer and RLC layer respectively. In the example of correlation time interval configuration 608, the correlation time interval for the corresponding network analysis task is 1 second.

As shown in correlation time interval configuration 610, in some embodiments, a network analysis task is performed using a first network event of PDCP DL statistics that are associated with the PDCP layer, and a second network event of Physical Uplink Control Channel (PUCCH) associated with the RLC layer. In the example of correlation time interval configuration 610, the correlation time interval for the corresponding network analysis task is 2 seconds.

As shown in correlation time interval configuration 612, in some embodiments, a network analysis task is performed using a downlink network event and an uplink network event. An example of the downlink network event is a Physical Uplink Shared Channel (PUSCH) power control event. Examples of the uplink network events include PDCCH-PHICH Indication Report event, RLC UL AM ALL PDU event, and RLC UL UM Data PDU event. In the example of correlation time interval configuration 612, the correlation time interval for the corresponding network analysis task is 1 second.

As shown in correlation time interval configuration 614, in some embodiments, a network analysis task is performed using a serving cell information event and a neighbor cell information event. In the example of correlation time interval configuration 614, a neighbor cell information event that has the closet time interval with the serving cell information event may be selected.

In some embodiments, a network management task for drone control (e.g., using power control) for reducing interference to neighbor cells may include a correlation configuration for correlating serving cell information events and neighbor cell information events. Such a correlation configuration may include correlation key configuration 512 of FIG. 5 and correlation time interval configuration 614 of FIG. 6.

The method 300 may proceed to block 312, where network analysis information is generated by correlating network events based on the network event analysis parameters (e.g., correlation keys of network events and/or correlation time interval associated with the network analysis task). In the example of FIG. 1, at block 312, the network analysis information generator 122 generates the network analysis information using the correlated network events based on the correlation parameters from the network analysis parameter generator 117.

Referring to FIGS. 7, 8, 9A, and 9B, various examples of network analysis information based on different network analysis task and correlation configurations are illustrated. In the example of FIG. 7, network analysis information is generated by correlating VoLTE UL MAC events and VoLTE UL RLC events. Specifically, network analysis information 710-1 is generated by correlating VoLTE UL MAC event 702-2 and VoLTE UL RLC event 706-1 based on a correlation configuration including correlation key configurations 502 and 506 and correlation time interval configuration 604. Such correlation may be performed by matching (e.g., exactly matching, proximate matching based on a predetermined difference threshold) the correlation keys of the corresponding network events. The correlation may further be performed by determining that the two corresponding network events are within the correlation time interval. Similarly, network analysis information 710-2 is generated by correlating VoLTE UL MAC event 702-3 and VoLTE UL RLC event 706-3 based on the correlation configuration including correlation key configurations 502 and 506 and correlation time interval configuration 604.

Figure 8:
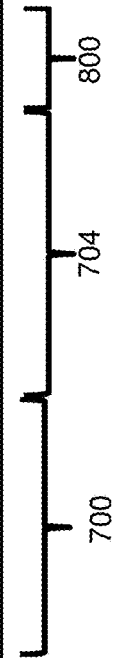
FIG. 8 is a diagram illustrating an embodiment of a network management device displaying a network analysis information screen or a portion thereof.

In the example of FIG. 8, in some embodiments, the network analysis information is generated by correlating events of three event categories including VoLTE UL MAC events, VoLTE UL RLC events, and PHICH events. As shown in FIG. 7, the network analysis information 710-1 and 710-2 have been generated by correlating the VoLTE UL MAC events and VoLTE UL RLC events. As such, network analysis information 806-1 and 806-2 are generated by correlating the network analysis information 710-1 and 710-2 with the PHICH events. Specifically, network analysis information 806-1 is generated by correlating network analysis information 710-1 with PHICH event 802-1 based on the correlation configuration including correlation key configuration 508 and correlation time interval configuration 606. Similarly, network analysis information 806-2 is generated by correlating network analysis information 710-2 with PHICH event 802-3 based on the correlation configuration including correlation key configuration 508 and correlation time interval configuration 606.

Referring to FIGS. 9A and 9B, network analysis information is generated by correlating serving cell information events and their corresponding neighbor cell information events based on, for example, a correlation configuration including correlation key configuration 512 and correlation time interval configuration 614. In some embodiments, the same neighbor cell information event (e.g., neighbor cell information event 906-1) is correlated with different serving cell information events (e.g., serving cell information events 904-1, 904-2, and 904-3) to generate different network analysis information (e.g., network analysis information 908-1, 908-2, and 908-3) respectively. In some embodiments, network analysis information (e.g., network analysis information 908-4) may correlate a serving cell information event (e.g., serving cell information event 904-4) for a single serving cell with a neighbor cell information event (e.g., neighbor cell information event 906-2) for two or more neighbor cells.

In some embodiments, the network analysis information for drone control may further include location data of the user device for network analysis. For example, first network analysis information may be generated based on network events associated with a user device (e.g., a drone) at a first height, and second network analysis information may be generated based on network events associated with the user device at a second height. Such location data may be collected by a location sensor (e.g., a GPS) on the drone and sent to the system provider device 102. As discussed below, network analysis presentation data and/or network management message may be generated based on the network analysis information, including the various properties (e.g., the timestamp, the height, the serving cell information, the neighbor cell information) therein.

The method 300 may proceed to block 314, where network analysis presentation data is generated (e.g., using a network analysis presentation unit 124 of FIG. 1) using the network analysis information, and transmit the network analysis presentation data to an operator device and cause the network analysis presentation data to be displayed to an operator (e.g., using a display of the operator device) with various visual representations. The operator device may be the user device 104 or any other device connected to the system provider device 102. Such visual representations include, for example, number representations, graphical representations such as heat map using colors, shades, patterns, two-dimensional or three-dimensional representations, any suitable visual representation, and/or a combination thereof.

Figure 10A:
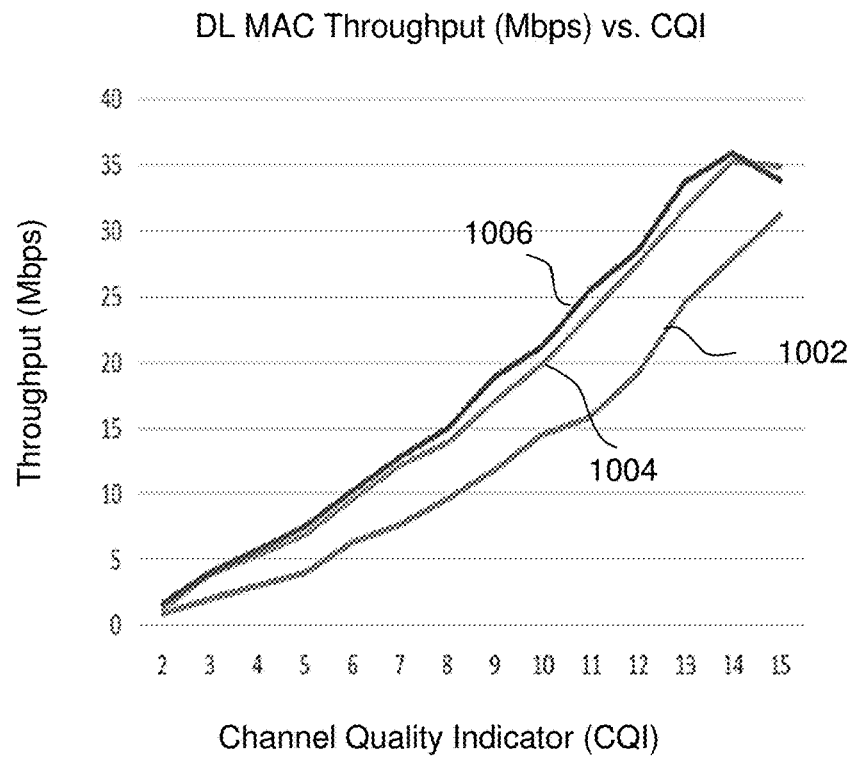
FIGS. 10A, 10B, 10C, and 10D are diagrams illustrating various embodiments network analysis information presentations.
Figure 10B:
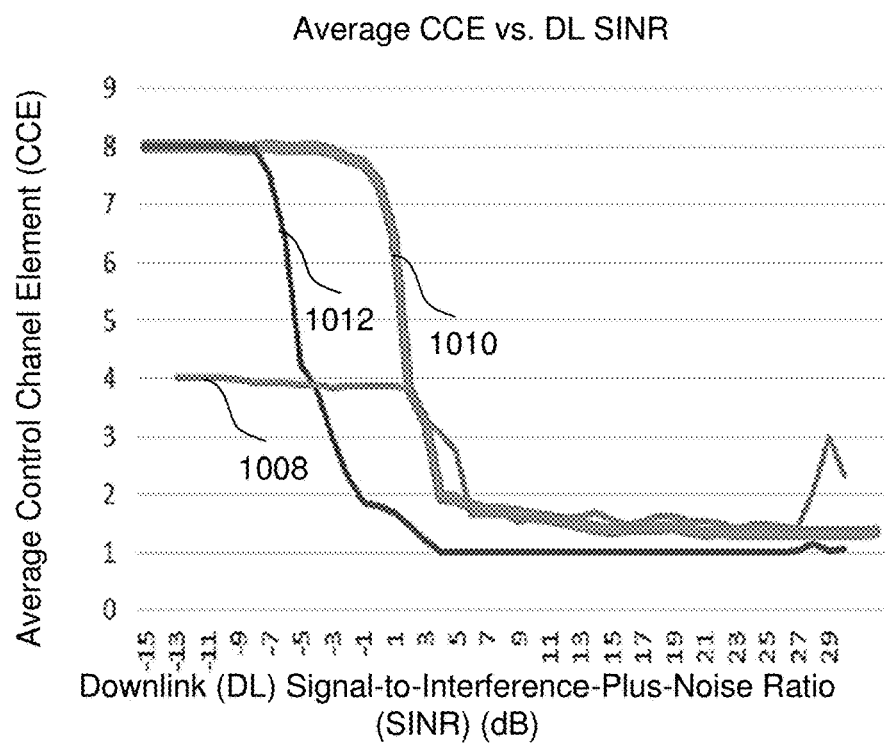
Figure 10C:
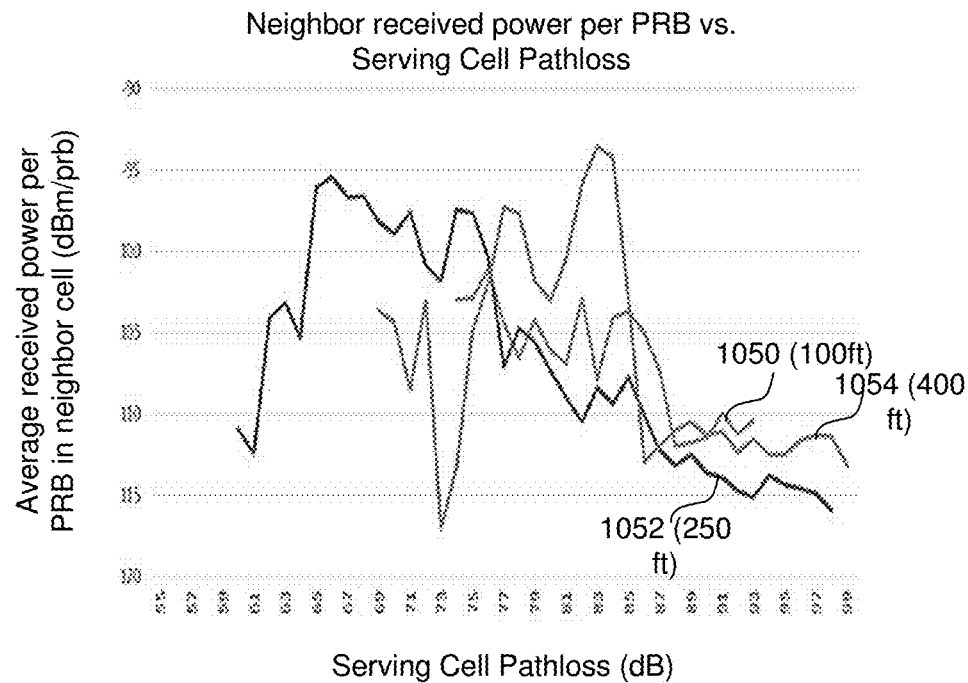
Figure 10D:
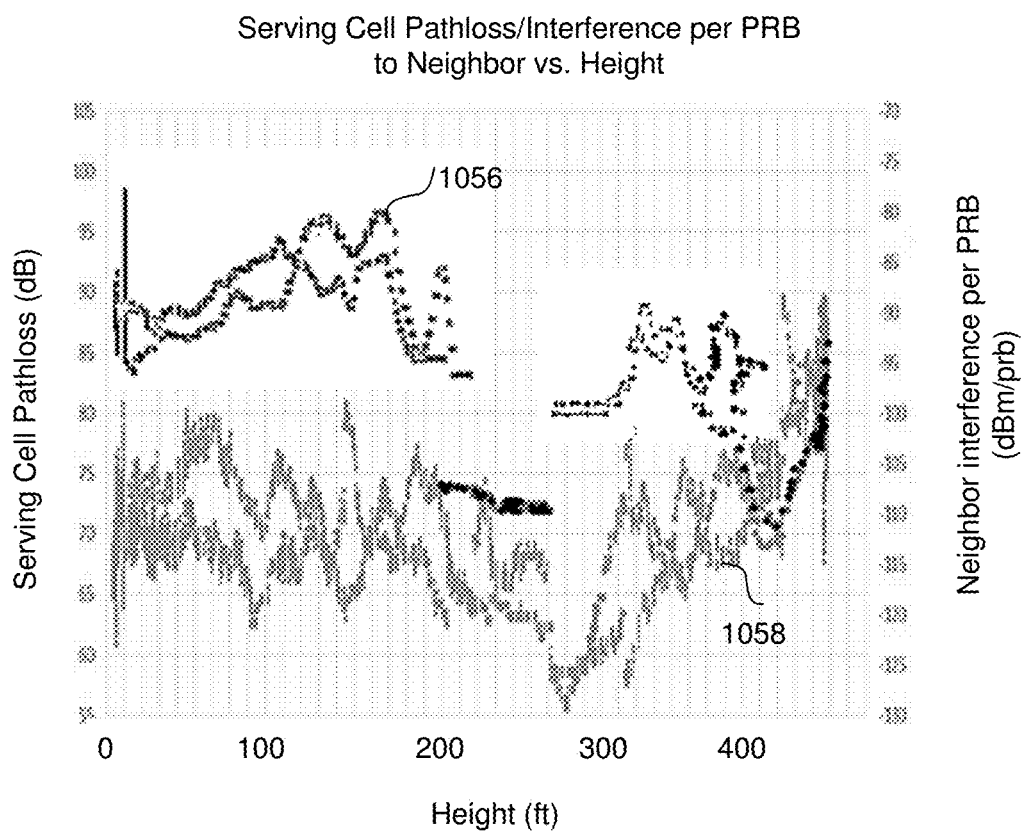

Referring to FIGS. 10A, 10B, 10C, and 10D, the network analysis presentation data may be generated based on the different requirements of the network management tasks. The examples of FIGS. 10A and 10B are associated with a network management task for network vendor comparison and selection, and the examples of FIGS. 100 and 10D are associated with a network management task for drone control. In FIG. 10A, three curves 1002, 1004, and 1006 corresponding to three network vendors are illustrated based on network analysis information including information associated with channel quality indicator (001) and DL MAC throughput information. In FIG. 10B, three curves 1008, 1010, and 1012 corresponding to the three network vendors of FIG. 10A are illustrated based on network analysis information including information associated with DL signal-to-interference-plus-noise ratio (SINR) and average control channel element (CCE). Network vendor performance comparison and/or selection may be performed by an operator receiving the network analysis presentation information.

In FIG. 100, three curves 1050, 1052, and 1054 corresponding to three user device heights (e.g., 100 feet, 250 feet, 400 feet) are illustrated based on network analysis information including information associated with serving cell pathloss and neighbor received power per PRB. In FIG. 10D, different shades are used to illustrated different network properties. For example, graph 1056 uses a darker shade to illustrate the correlation between serving cell pathloss and height of the user device, and graph 1058 uses a lighter shade to illustrate the correlation between neighbor interference and height of the user device.

The method 300 may proceed to block 316, where network management message is generated (e.g., using a network management unit 126 of FIG. 1) based on the network analysis information, and transmitted to the user device and/or network for network management. The network management message may include control parameters and values (e.g., power control parameters and values for drone control to reduce neighbor cell interference), optimization recommendations, for the user device 104, the network 106, or any other any other user devices and networks that share similar network characteristics with the user device 104 or the network 106. In some embodiments, the network management message is sent to the user device 104 and/or network 106, and the corresponding network management tasks of the network management message are automatically performed by user device 104 and/or network 106. In alternative embodiments, the network management message is sent to an operator device, such that the operator may control the network or make decisions (e.g., select from recommendations, authorize, deny, start, and/or stop network management tasks) based on the network management message.

Figure 11:
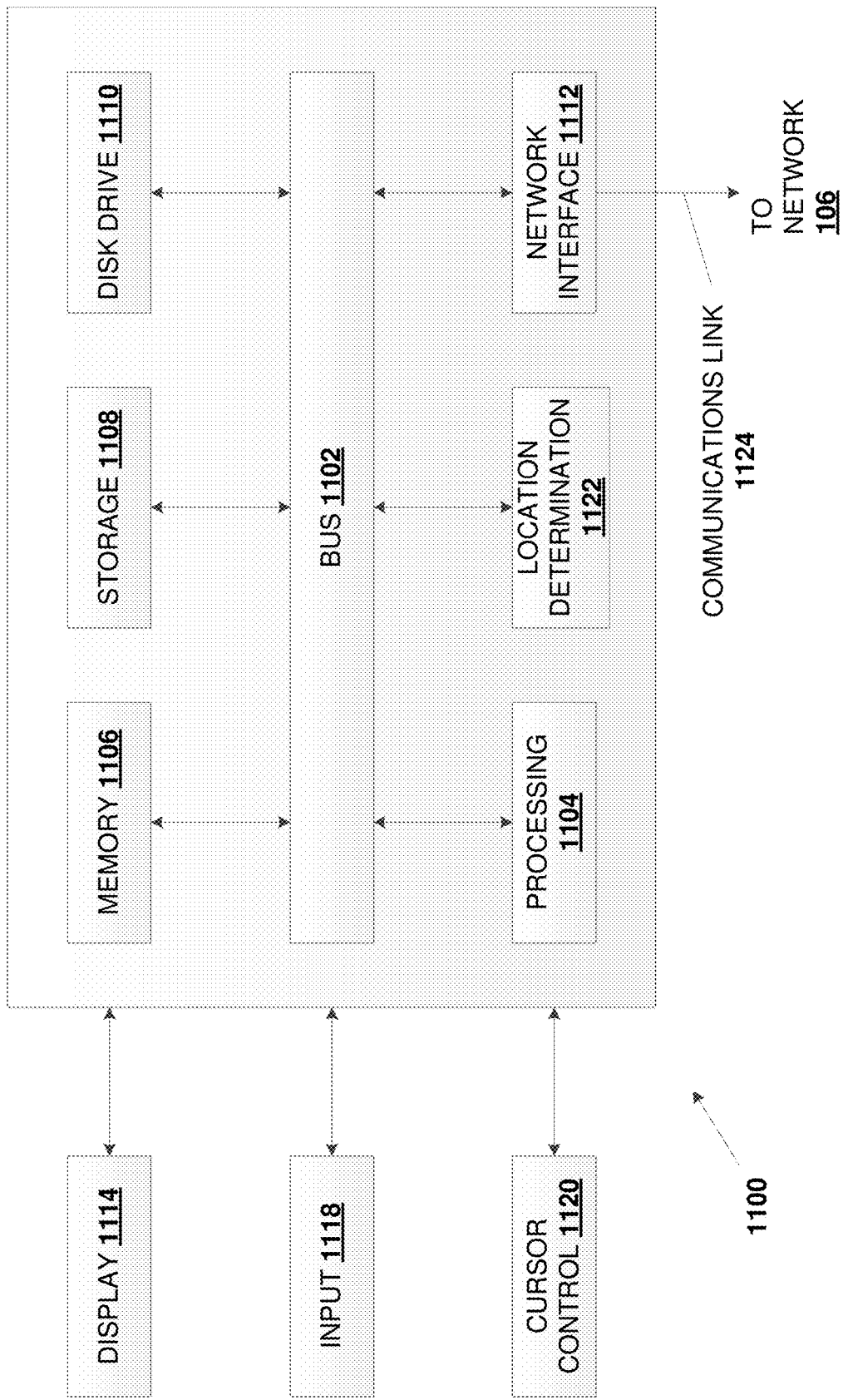
FIG. 11 is a schematic view illustrating an embodiment of a computer system.

Referring now to FIG. 11, an embodiment of a computer system 1100 suitable for implementing, for example, the system provider device 102, user device 104, and operator device is illustrated. It should be appreciated that other devices utilized in the network analysis and management system 100 discussed above may be implemented as the computer system 1100 in a manner as follows.

In accordance with various embodiments of the present disclosure, computer system 1100, such as a computer and/or a network server, includes a bus 1102 or other communication mechanism for communicating information, which interconnects subsystems and components, such as a processing component 1104 (e.g., processor, micro-controller, digital signal processor (DSP), etc.), a system memory component 1106 (e.g., RAM), a static storage component 1108 (e.g., ROM), a disk drive component 1110 (e.g., magnetic or optical), a network interface component 1112 (e.g., modem or Ethernet card), a display component 1114 (e.g., CRT or LCD), an input component 1118 (e.g., keyboard, keypad, or virtual keyboard), a cursor control component 1120 (e.g., mouse, pointer, or trackball), and/or a location determination component 1122 (e.g., a Global Positioning System (GPS) device as illustrated, a cell tower triangulation device, and/or a variety of other location determination devices.) In one implementation, the disk drive component 1110 may comprise a database having one or more disk drive components.

In accordance with embodiments of the present disclosure, the computer system 1100 performs specific operations by the processing component 1104 executing one or more sequences of instructions contained in the system memory component 1106, such as described herein with respect to the drone(s), the drone docking station(s), the service platform, and/or the remote monitor(s). Such instructions may be read into the system memory component 1106 from another computer-readable medium, such as the static storage component 1108 or the disk drive component 1110. In other embodiments, hardwired circuitry may be used in place of or in combination with software instructions to implement the present disclosure.

Logic may be encoded in a computer-readable medium, which may refer to any medium that participates in providing instructions to the processing component 1104 for execution. Such a medium may take many forms, including but not limited to, non-volatile media, volatile media, and tangible media employed incident to a transmission. In various embodiments, the computer-readable medium is non-transitory. In various implementations, non-volatile media includes optical or magnetic disks and flash memory, such as the disk drive component 1110, volatile media includes dynamic memory, such as the system memory component 1106, and tangible media employed incident to a transmission includes coaxial cables, copper wire, and fiber optics, including wires that comprise the bus 902 together with buffer and driver circuits incident thereto.

Some common forms of computer-readable media include, for example, floppy disk, flexible disk, hard disk, magnetic tape, any other magnetic medium, CD-ROM, DVD-ROM, any other optical medium, any other physical medium with patterns of holes, RAM, PROM, EPROM, FLASH-EPROM, any other memory chip or cartridge, cloud storage, or any other medium from which a computer is adapted to read. In various embodiments, the computer-readable media are non-transitory.

In various embodiments of the present disclosure, execution of instruction sequences to practice the present disclosure may be performed by the computer system 1100. In various other embodiments of the present disclosure, a plurality of the computer systems 1100 coupled by a communication link 1124 to a communication network 106 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1100 may transmit and receive messages, data, information and instructions, including one or more programs (e.g., application code) through the communication link 1124 and the network interface component 1112. The network interface component 1112 may include an antenna, either separate or integrated, to enable transmission and reception via the communication link 1124. Received program code may be executed by processor 1104 as received and/or stored in disk drive component 1110 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components, and vice versa.

Software, in accordance with the present disclosure, such as program code or data, may be stored on one or more computer-readable media. It is also contemplated that software identified herein may be implemented using one or more general-purpose or special-purpose computers and/or computer systems, networked and/or otherwise. Where applicable, the ordering of various steps described herein may be changed, combined into composite steps, and/or separated into sub-steps to provide features described herein.

The foregoing is not intended to limit the present disclosure to the precise forms or particular fields of use disclosed. As such, it is contemplated that various alternate embodiments and/or modifications to the present disclosure, whether explicitly described or implied herein, are possible. Persons of ordinary skill in the art in possession of the present disclosure will recognize that changes may be made in form and detail without departing from the scope of what is claimed.

What is claimed is:

1. A network analysis and management system comprising:
    at least one communications interface;
    at least one non-transitory memory;
    one or more processors coupled to the communications interface and non-transitory memory and configured to read instructions from the non-transitory memory to cause the system to perform operations comprising:
        receiving a plurality of network events including first and
    second network events associated with communication between a first user device and a network using a first protocol stack including a plurality of layers;
generating first network analysis information by correlating the first and second network events based on a correlation configuration associated with a network management task associated with the network,
    wherein first and second correlation keys associated with the first and second network events respectively are generated based on a correlation key configuration of the correlation configuration, and
    wherein the first and second network events are correlated by matching the first and second correlation keys;
    providing, to one of the first user device and the network, a network management message based on the first network analysis information for performing the network management task.

2. The network analysis and management system of claim 1, wherein the network management task is associated with uplink power control of the first user device, and
    wherein the network management message includes one or more uplink power control parameters associated with the first user device.

3. The network analysis and management system of claim 1, wherein the first network event includes a serving cell information event associated with a serving cell of the network for the communication.

4. The network analysis and management system of claim 3, wherein the second network event includes a neighbor cell information event associated with a first neighboring cell of the serving cell.

5. The network analysis and management system of claim 4, wherein the neighbor cell information event is associated with a second neighboring cell of the serving cell.

6. The network analysis and management system of claim 3, wherein the network management task is associated with controlling the first user device to reduce interference to neighbor cells.

7. The network analysis and management system of claim 1, wherein the first user device is an unmanned aerial vehicle apparatus,
    wherein the first and second network events are associated with a first height of the first user device, wherein the operations include:
   generating second network analysis information using third and fourth network events based on the correlation configuration; and
   generating the network management message based on the first network analysis information and the second network analysis information.

8. A method of network analysis and management, comprising:
   receiving a plurality of network events including first and second network events associated with communication between a first user device and a network using a first protocol stack including a plurality of layers;
   generating first network analysis information by correlating the first and second network events based on a correlation configuration associated with a network management task associated with the network,
      wherein first and second correlation keys associated with the first and second network events respectively are generated based on a correlation key configuration of the correlation configuration, and
      wherein the first and second network events are correlated by matching the first and second correlation keys;
   providing, to one of the first user device and the network, a network management message based on the first network analysis information for performing the network management task.

9. The method of claim 8, wherein the network management task is associated with uplink power control of the first user device, and
   wherein the network management message includes one or more uplink power control parameters associated with the first user device.

10. The method of claim 8, wherein the first network event includes a serving cell information event associated with a serving cell of the network for the communication.

11. The method of claim 10, wherein the second network event includes a neighbor cell information event associated with a first neighboring cell of the serving cell.

12. The method of claim 11, wherein the neighbor cell information event is associated with a second neighboring cell of the serving cell.

13. The method of claim 10, wherein the network management task is associated with controlling the first user device to reduce interference to neighbor cells.

14. The method of claim 8, wherein the first user device is an unmanned aerial vehicle apparatus,
   wherein the first and second network events are associated with a first height of the first user device,
   wherein the operations include:
      generating second network analysis information using third and fourth network events based on the correlation configuration; and
      generating the network management message based on the first network analysis information and the second network analysis information.

15. A non-transitory machine-readable medium having stored thereon machine-readable instructions executable to cause a machine to perform operations comprising:
   receiving a plurality of network events including first and second network events associated with communication between a first user device and a network using a first protocol stack including a plurality of layers;
   generating first network analysis information by correlating the first and second network events based on a correlation configuration associated with a network management task associated with the network,
      wherein first and second correlation keys associated with the first and second network events respectively are generated based on a correlation key configuration of the correlation configuration, and
      wherein the first and second network events are correlated by matching the first and second correlation keys;
   providing, to one of the first user device and the network, a network management message based on the first network analysis information for performing the network management task.

16. The non-transitory machine-readable medium of claim 15, wherein the network management task is associated with uplink power control of the first user device, and
   wherein the network management message includes one or more uplink power control parameters associated with the first user device.

17. The non-transitory machine-readable medium of claim 15, wherein the first network event includes a serving cell information event associated with a serving cell of the network for the communication.

18. The non-transitory machine-readable medium of claim 15, wherein the second network event includes a neighbor cell information event associated with a first neighboring cell of the serving cell.

19. The non-transitory machine-readable medium of claim 18, wherein the neighbor cell information event is associated with a second neighboring cell of the serving cell.

20. The non-transitory machine-readable medium of claim 17, wherein the network management task is associated with controlling the first user device to reduce interference to neighbor cells.

* * * * *